United States Patent [19]

Efford et al.

[11] Patent Number: 5,673,168

[45] Date of Patent: Sep. 30, 1997

[54] HIGH RIPPLE CURRENT CAPACITOR

[75] Inventors: Thomas W. Efford; Gary J. Buczkowski, both of West Jefferson; Mitchell D. Weaver, Fleetwood, all of N.C.

[73] Assignee: United Chemi-Con Manufacturing, Lansing, N.C.

[21] Appl. No.: 574,614

[22] Filed: Dec. 19, 1995

[51] Int. Cl.⁶ .................. H01G 9/10; H01G 2/08
[52] U.S. Cl. .................. 361/518; 361/519; 361/536; 361/537; 361/274.2; 361/274.3
[58] Field of Search .............. 361/274.2, 517–521, 361/535–539, 272–273, 274.1, 274.3

[56] References Cited

U.S. PATENT DOCUMENTS

| | | |
|---|---|---|
| 1,354,147 | 9/1920 | Thomas . |
| 1,511,935 | 10/1924 | Bayles et al. . |
| 1,596,374 | 8/1926 | Priess . |
| 1,870,961 | 8/1932 | Nyman et al. . |
| 2,448,407 | 8/1948 | Antalek . |
| 3,243,672 | 3/1966 | Simonds et al. . |
| 3,509,427 | 4/1970 | Ruscetta . |
| 3,593,072 | 7/1971 | Bailey . |
| 3,787,721 | 1/1974 | Gedzjun et al. . |
| 4,245,277 | 1/1981 | van Gils et al. . |
| 4,264,943 | 4/1981 | Anderson et al. . |
| 4,536,819 | 8/1985 | Duetsch . |
| 4,538,025 | 8/1985 | Goe et al. . |
| 5,381,301 | 1/1995 | Hudis ........................... 361/275.2 |

FOREIGN PATENT DOCUMENTS

| | | |
|---|---|---|
| 766432 | 8/1967 | Canada . |
| 270073 | 5/1970 | U.S.S.R. . |
| 707015 | 4/1954 | United Kingdom . |
| 1160216 | 8/1969 | United Kingdom . |

OTHER PUBLICATIONS

Assorted drawings believed taken from Japanese patent documents (2 sheets). No date is provided.

*Primary Examiner*—Bot L. Ledynh
*Attorney, Agent, or Firm*—Fitch, Even, Tabin & Flannery

[57] ABSTRACT

A capacitor structure for dissipating heat, for example, generated by high ripple currents. The capacitor includes an outer casing of substantially annular cross section comprising an outer side wall, a bottom and an interior tube integrally formed from a substantially continuous piece of thermally conductive material. A capacitor winding of substantially annular cross section is disposed within the outer casing which is sealed at a top. The capacitor winding may be in close thermal contact with the inner tube, the bottom and the outer side wall to improve heat dissipation.

8 Claims, 2 Drawing Sheets

HIGH RIPPLE CURRENT CAPACITOR

BACKGROUND OF THE INVENTION

The present invention relates to capacitors capable of withstanding high alternating "ripple" current loads and more particularly to electrolytic capacitors having improved ability to dissipate heat generated by such ripple currents.

Capacitors are routinely subject to ripple currents, particularly when used as filters in DC power supplies and AC inverters. Through known circuitry arrangements, the capacitor is used to reduce the ripple current to an amount meeting the tolerances imposed on the power supply. The reduction of ripple current, however, generates heat within the capacitor which can ruin or at least shorten, the useful lifetime of the capacitor. Accordingly, increasing the ripple current handling capacity of capacitors is desired by the industry.

Traditional methods of increasing the ripple current handling capability of electrolytic capacitors have been to increase the maximum rated operating temperature of the capacitor or to reduce its equivalent series resistance to decrease the power absorbed by the capacitor. Both of these methods increase the cost of the modified capacitors. Another known method has been to increase heat dissipation by the capacitor by lowering its effective thermal resistance. The latter methods allow the electrical properties of the capacitive element to remain the same, which is an advantage. However, the added structures needed to dissipate the heat have increased both the size and complexity of the overall capacitors, which reduces both their desirability and usefulness and also increases their cost. It is an object of the present invention to increase the thermal dissipation of capacitors without significant size, cost and complexity increases.

SUMMARY OF THE INVENTION

The capacitor includes an outer casing comprising a cylindrical outer side wall, a bottom and an internal tube extending through the bottom and through an opening in a top closure of the capacitor. The capacitor winding is produced with a substantially cylindrical central opening which is disposed over the sides of the internal tube between the tube and the outer side wall. The internal tube is in close thermal contact with the bottom which is in turn in close thermal contact with an end of the outer side wall. Advantageously, the internal tube, the bottom and the outer side wall are all integrally formed from a single piece of thermally conductive material such as aluminum.

The internal tube makes advantageous use of the previously unused space in the center of a capacitor winding which is left when the winding mandrel is removed. The internal tube conveys fluid, such as air, by convection or can be attached to forced fluid flow for heat dissipation. Further, the close thermal contact between the components of the casing allows thermal conduction through the entire casing to convey heat from hot spots to relatively cooler areas where it can be dissipated.

Advantageously, the winding is placed in close thermal contact with the various parts of the casing. The central opening of the winding is sized to approximate the exterior diameter of the internal tube for a tight, thermally conductive fit. The winding is pressed down into the casing so that close thermal contact is made with the bottom of the casing. Additionally, the outer side wall of the casing may be deformed in grooves to press into the winding to promote thermal transfer as well as structural soundness. Further, the internal tube may be extended through the bottom of the casing to form a hollow stud for mounting the capacitor. The hollow stud allows convection and forced fluid cooling through the internal tube and permits the capacitor to be connected in thermal contact with a heat sink. The above normal construction produces a capacitor capable of operating with large ripple currents by rapidly dissipating the heat generated in the capacitor by such currents.

DETAILED DESCRIPTION OF PREFERRED EMBODIMENT

Figure 1:
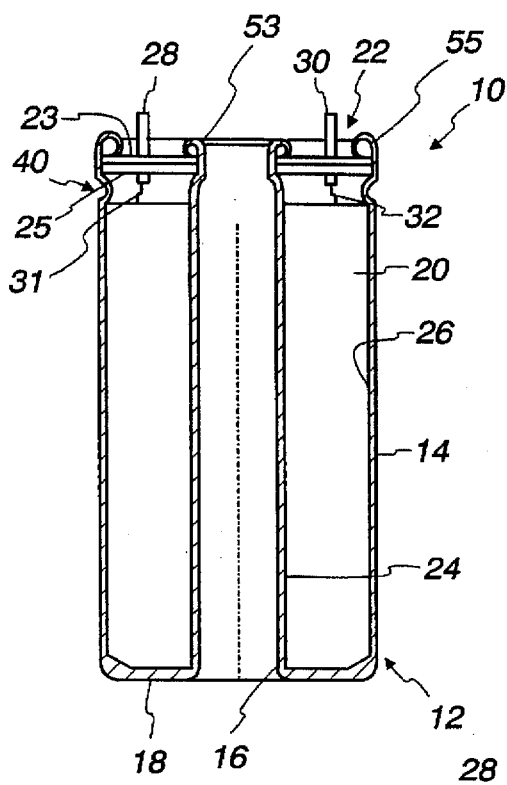
FIG. 1 is a longitudinal sectional view of a capacitor constructed in accordance with the invention.
Figure 2:
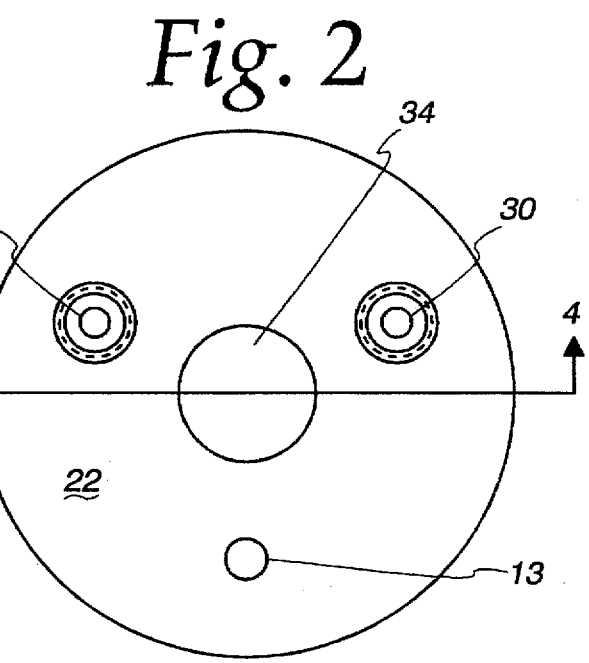
FIG. 2 is a top plan view of a closure for the capacitor.

FIG. 1 is a longitudinal cross-sectional view of a preferred embodiment of a capacitor 10. FIG. 2 shows a top plan view of a closure 22 for capacitor 10. Capacitor 10 includes a casing 12 having a substantially cylindrical outer side wall 14, an open internal tube 16 and a bottom 18 integrally formed with the outer side wall 14 and the internal tube 16. Internal tube 16 is open through the bottom 18 for fluid communication beyond the casing. A wound capacitor body 20 is disposed within the casing 12 surrounding the internal tube 16. Closure member 22 (see also FIG. 2) is sealably fixed to the outer diameter 24 of the internal tube 16 and into the inner diameter 26 of the outer wall 14. Closure member 22 is comprised of two layers of insulating material 23 and 25 (FIG. 4) through which a first terminal 28 is electrically connected to the anode of capacitor body 20 and a second terminal 30 is electrically connected to the cathode of capacitor body 20. Capacitor body 20 may, for example, be convolutely wound and include conductors 31 and 32 for connection to the terminals 28 and 30.

Preferably, casing 12 is comprised of thin walled aluminum having good thermal conductivity. Although the casing may be formed by several known processes, such as casting or deep drawing, desirable containers are produced from an impact extrusion process. Such processes produce an integral assembly in which the outer wall, the bottom and the internal tube are all formed from a single piece of aluminum.

Figure 3:
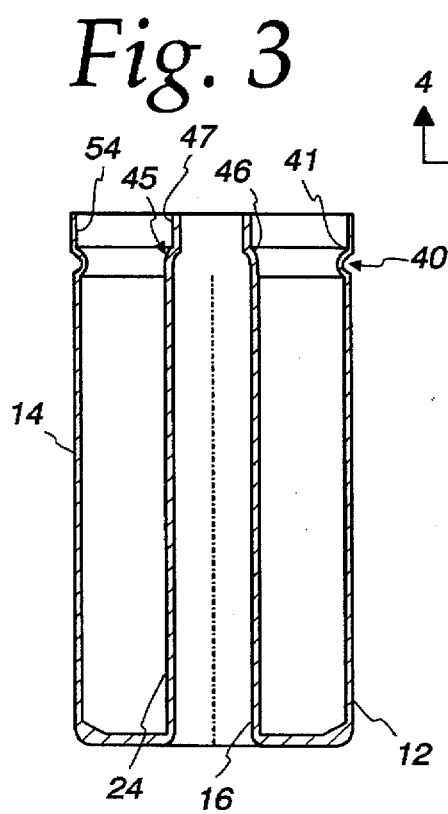
FIG. 3 is a longitudinal sectional view of a capacitor casing.

FIG. 3 shows a cross section of a casing 12 prior to the assembly of the capacitor 10. The casing is originally formed to have a straight side wall 14 and a straight internal tube 16. The ductile aluminum of the container is worked at 40 to form a groove running around the circumference of the outer wall 14. The groove 40 creates a lip 41 on the interior of side wall 14, which lip provides a support surface for the closure member 22. The internal tube 16 is also worked to reduce its diameter at a point 45 which is substantially coplanar with the top of groove 40. The reduction in diameter 47 of internal tube 16 provides a support ledge 46 for the open center 34 of closure member 22.

Figure 4:
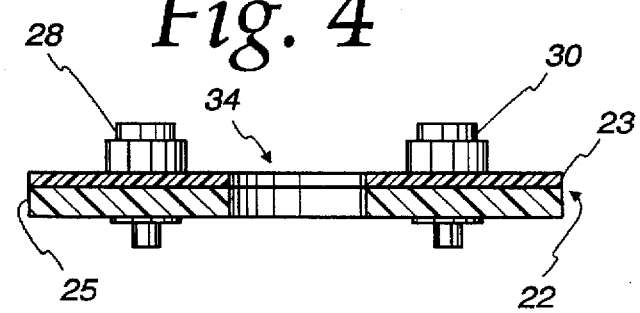
FIG. 4 is a sectional view of the closure of FIG. 2 along sectional line 4—4.

Closure 22 is shown in plan view in FIG. 2 and in cross section in FIG. 4. Closure 22 is comprised of a first layer 25 of phenolic material which is electrically insulating and provides strength to the closure. The second layer 23 is comprised of elastomeric sealing gasket material which helps seal the open end of the capacitor, as discussed below. The terminals 28 and 30 are disposed through both layers 23 and 25 of closure 22 to provide electrical contact from the interior of the container to the exterior. A vent apparatus 13 may also be disposed through closure 22 in a manner well known in the art.

To begin assembly, the anode and cathode of capacitor body 20 are connected to terminals 28 and 30 by means of conductors 31 and 32. The capacitor body 20 is formed to have a hollow inner center of substantially the same diameter as the outer diameter 24 of the internal tube 16. The outer diameter of the capacitor body 20 may be advantageously formed to be similar to the inner diameter of outer side wall 14. The capacitor body 20 is placed in the container so that its hollow inner center fits over the internal tube 16 and its outer diameter is at or near the inner surface of the outer side wall 14. As the capacitor body 20 is inserted into container 12 the closure 22 is pressed down over the reduced diameter portion 47 of the internal tube 16 and the outer circumference of the closure enters the upper extension 54 of the outer side wall. The closure 22 is pressed into place until its center rests on ledge 46 and its perimeter rests on lip 41.

When the closure 22 is in place the ductile aluminum of the side wall extension 54 is curled 55 over onto the gasket material 23 of closure 22. The curled edge 55 is formed by arrangements known in the art and can both firmly hold closure 22 as well as seal the outer perimeter of the closure. Similarly, the portion 47 of the interior tube 16 is worked to form a curl 53 which retains and seals the center of the closure 22 to the interior tube 16.

The capacitor 10 as described herein provides improved abilities to withstand high ripple currents. The internal tube 16 makes use of normally wasted space inside a wound coil type capacitor. The presence of the tube increases the overall surface area of the container and thereby improves heat dissipation. The central tube will create fluid flow by convection and it can be employed to convey forced fluids for heat dissipation. Further, the thermal conductivity between the tube and bottom as well as between the bottom and side wall increases thermal conductivity between hot spots and relatively cooler spots on the container.

As previously mentioned, the central opening of the winding is substantially the same as the exterior diameter 24 of tube 16. When winding 20 is pushed into place, the identity of sizes results in a tight fit which improves thermal conductivity from winding 20 to tube 16. Additionally, the winding is pressed down into the casing so that its bottom abuts the bottom 18 of the casing. This promotes good thermal conduction from the winding to the casing bottom.

Figure 5:
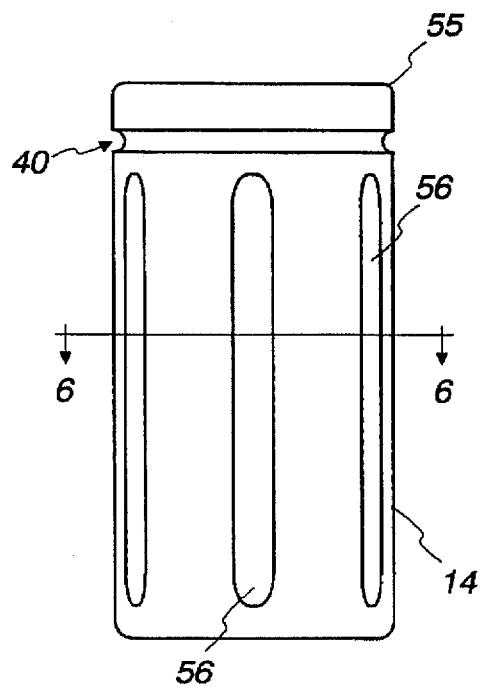
FIG. 5 is an exterior view of a capacitor with longitudinal grooves in an outer wall.
Figure 6:
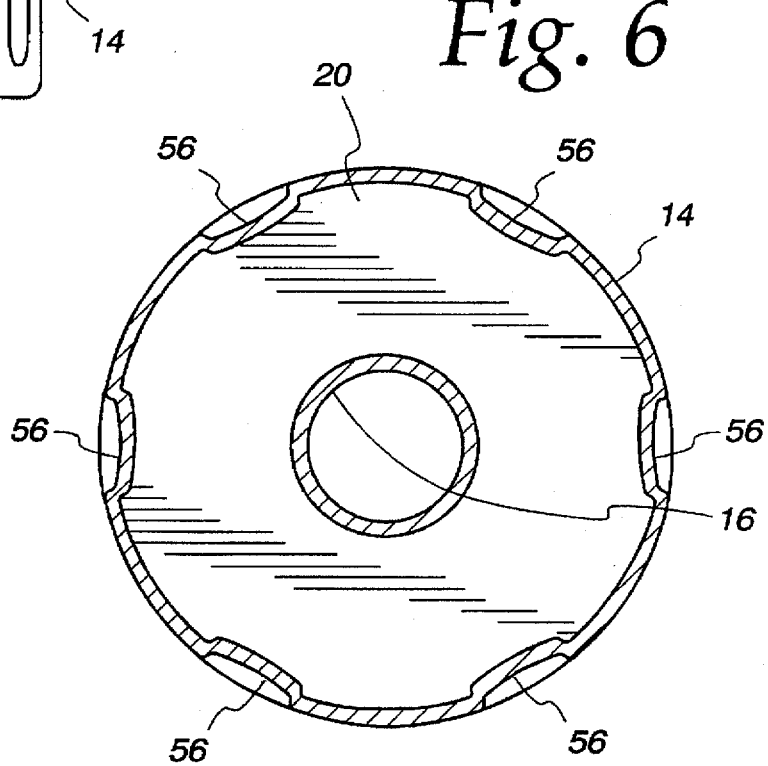
FIG. 6 is a sectional view of FIG. 5 along sectional line 6—6.

FIGS. 5 and 6 represent an additional advantageous feature of the capacitor. As previously discussed, the capacitor body 20 may advantageously have an outer diameter which is similar to the inner diameter 26 of side wall 14. The side wall 14 of the container may then be deformed to include indentations 56 running parallel to the longitudinal axis of the casing. These indentations are, in fact, grooves which place portions of the aluminum side wall 14 into contact with the capacitor body 20. The grooves 56 improve the soundness of the packaging by retaining the winding and they promote thermal transfer from the winding 20 to the outer side wall 14.

Figure 7:
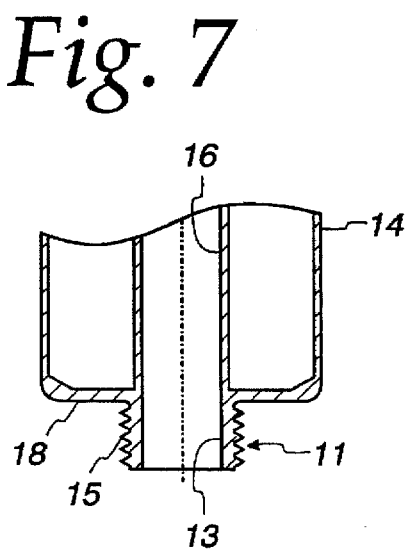
FIG. 7 is a longitudinal sectional view of the bottom portion of a capacitor embodiment.

FIG. 7 shows the bottom of a capacitor including an additional feature. In FIG. 7, the internal tube 16 is extended through bottom 18 to form a hollow stud 11. Stud 11 has an internal wall 13 which is a substantially continuous extension of the internal wall of internal tube 16. Stud 11 also includes screw threads 15 for mounting the capacitor to a heat sink by means of a threaded nut (not shown). A casing of the type shown in FIG. 7 which includes stud 11 may be formed during an impact extrusion process. Alternatively, the stud 11 may be separately formed and attached to a casing of the type shown in FIG. 1 by welding or other known attachment process.

The invention has been described with reference to an embodiment of a specific capacitor. Modification may be made to the described embodiment within the scope of the invention as set forth in the following claims.

What is claimed is:

1. A high ripple current capacitor comprising
an outer casing of substantially annular cross section comprising an outer side wall having an interior diameter, a bottom and a hollow interior tube having an outer diameter disposed within the outer side wall and extending through said bottom, the outer side wall, bottom and interior tube being integrally formed from a substantially continuous piece of thermally conductive material, a convolute wound capacitor winding having substantially annular cross section and being disposed within the outer side wall and surrounding the interior tube, and a substantially annular closure member comprising an opening to receive the outer diameter of the interior tube, the closure member comprising apparatus for sealing the closure member to the interior diameter of the outer side wall and for sealing the opening therein to the outer diameter of the interior tube whereby fluid movement through the interior tube conveys heat from the capacitor and the thermally conductive material of the outer casing conducts heat from the interior tube to the bottom and the outer side wall.

2. The capacitor of claim 1 wherein the thermally conductive material is aluminum.

3. The capacitor of claim 2 wherein the capacitor winding is in close thermal contact with the interior tube to promote thermal conveyance therebetween.

4. The capacitor of claim 3 wherein the capacitor winding is pressed against an interior surface of the bottom to promote thermal conveyance therebetween.

5. The capacitor of claim 2 wherein the outer side wall is deformed into the volume of the outer casing to promote thermal conveyance between the outer side wall and the winding.

6. The capacitor of claim 5 wherein the deformations comprise a plurality of grooves in the outer side wall pressing the inner surface of the outer side wall into the winding.

7. The capacitor of claim 6 wherein the grooves run longitudinally along the longitudinal axis of the outer side wall.

8. The capacitor of claim 1 wherein the internal tube extends through the bottom and forms a hollow mounting stud.

* * * * *